(12) United States Patent
Chae et al.

(10) Patent No.: US 10,122,580 B2
(45) Date of Patent: Nov. 6, 2018

(54) OPERATION METHODS OF COMMUNICATION NODE IN NETWORK

(71) Applicant: Hyundai Motor Company, Seoul (KR)

(72) Inventors: Jun Byung Chae, Seoul (KR); Jin Hwa Yun, Seoul (KR); Kang Woon Seo, Seoul (KR); Dong Ok Kim, Gyeonggi-do (KR); Sang Woo Yu, Seoul (KR)

(73) Assignee: Hyundai Motor Company, Seoul (KR)

(\*) Notice: Subject to any disclaimer, the term of this patent is extended or adjusted under 35 U.S.C. 154(b) by 79 days.

(21) Appl. No.: 15/290,516

(22) Filed: Oct. 11, 2016

(65) Prior Publication Data
US 2017/0104631 A1    Apr. 13, 2017

(30) Foreign Application Priority Data

Oct. 12, 2015 (KR) .................. 10-2015-0142298

(51) Int. Cl.
| | | |
|---|---|---|
| *H04L 12/24* | (2006.01) | |
| *H04L 12/861* | (2013.01) | |
| *H04L 12/931* | (2013.01) | |
| *H04L 29/08* | (2006.01) | |
| *H04L 29/06* | (2006.01) | |
| *H04L 12/40* | (2006.01) | |

(52) U.S. Cl.
CPC ........ *H04L 41/0823* (2013.01); *H04L 49/201* (2013.01); *H04L 49/9036* (2013.01); *H04L 65/1069* (2013.01); *H04L 65/4084* (2013.01); *H04L 65/607* (2013.01); *H04L 65/608* (2013.01); *H04L 67/28* (2013.01); *H04L 69/161* (2013.01); *H04L 69/22* (2013.01); *H04L 69/323* (2013.01); *H04L 2012/40273* (2013.01)

(58) Field of Classification Search
CPC ............. H04L 41/0823; H04L 65/4084; H04L 65/607; H04L 65/608
See application file for complete search history.

(56) References Cited

U.S. PATENT DOCUMENTS

| | | | |
|---|---|---|---|
| 9,723,610 B2 * | 8/2017 | Rabii ............... | H04N 21/43637 |
| 2013/0215743 A1 * | 8/2013 | Pannell ................. | H04L 47/564 |
| | | | 370/230.1 |

\* cited by examiner

*Primary Examiner* — Mohammad S Anwar
(74) *Attorney, Agent, or Firm* — Brinks Gilson & Lione

(57) ABSTRACT

An operation method of a communication node in a vehicle network is disclosed. A transmission method performed by a communication node may be configured to comprise performing an initialization operation for transmission of an audio video bridging (AVB) stream, performing an operation of obtaining a buffer for the transmission of the AVB stream, performing the transmission of the AVB stream stored in the buffer, and performing an operation of finalizing the transmission of the AVB stream. Accordingly, performance of the vehicle network can be enhanced.

19 Claims, 8 Drawing Sheets

OPERATION METHODS OF COMMUNICATION NODE IN NETWORK

CROSS-REFERENCE TO RELATED APPLICATIONS

This application claims priority to Korean Patent Application No. 10-2015-0142298, filed on Oct. 12, 2015 in the Korean Intellectual Property Office (KIPO), the entirety of which are incorporated by reference herein.

BACKGROUND

1. Technical Field

The present disclosure relates generally to operation of a communication node in a network, and more specifically, to a communication node including an abstract layer and an operation method of the communication node.

2. Description of the Related Art

Along with the rapid digitalization of vehicle parts, the number and variety of electronic devices installed within a vehicle have been increasing significantly. Electronic devices may currently be used throughout the vehicle, such as in a power train control system, a body control system, a chassis control system, a vehicle network, a multimedia system, and the like. The power train control system may include an engine control system, an automatic transmission control system, or the like. The body control system may include a body electronic equipment control system, a convenience apparatus control system, a lamp control system, or the like. The chassis control system may include a steering apparatus control system, a brake control system, a suspension control system, or the like. The vehicle network may include a controller area network (CAN), a FlexRay-based network, a media oriented system transport (MOST)-based network, or the like. The multimedia system may include a navigation apparatus system, a telematics system, an infotainment system, or the like.

Such systems and electronic devices constituting each of the systems are connected via the vehicle network, which supports functions of the electronic devices. For instance, the CAN may support a transmission rate of up to 1 Mbps and may support automatic retransmission of colliding messages, error detection based on a cycle redundancy interface (CRC), or the like. The FlexRay-based network may support a transmission rate of up to 10 Mbps and may support simultaneous transmission of data through two channels, synchronous data transmission, or the like. The MOST-based network is a communication network for high-quality multimedia, which may support a transmission rate of up to 150 Mbps.

Meanwhile, the telematics system, the infotainment system, as well as enhanced safety systems of a vehicle require higher transmission rates and system expandability. However, the CAN, FlexRay-based network, or the like may not sufficiently support such requirements. The MOST-based network may support a higher transmission rate than the CAN and the FlexRay-based network. However, costs increase to apply the MOST-based network to all vehicle networks. Due to these limitations, an Ethernet-based network may be considered as a vehicle network. The Ethernet-based network may support bi-directional communication through one pair of windings and may support a transmission rate of up to 10 Gbps.

The Ethernet-based vehicle network may include a plurality of communication nodes. The communication node may be a gateway, a switch (or, bridge), an end node, or the like. The communication node may operate based on various operating systems, and include a variety of hardware. In this case, a method for guaranteeing independency of operating systems and hardware is required.

SUMMARY

The present disclosure provides a communication node including an abstraction layer.

In addition, the present disclosure provides an operation method of a communication node including an abstraction layer.

In accordance with the forms of the present disclosure, a transmission method performed by a communication node in an Ethernet-based vehicle network may be provided. The communication node includes a hardware layer, an abstraction layer, a middleware layer, and an application layer. The transmission method may comprise performing, by the hardware layer, an initialization operation for transmission of an audio video bridging (AVB) stream based on a first request signal from the abstraction layer; performing, by the hardware layer, an operation of obtaining a buffer for the transmission of the AVB stream based on a second request signal from the abstraction layer; performing, by the hardware layer, the transmission of the AVB stream stored in the buffer based on a third request signal from the abstraction layer; and performing, by the hardware layer, an operation of finalizing the transmission of the AVB stream based on a fourth request signal from the abstraction layer.

The hardware layer may include a physical (PHY) layer unit and a medium access control (MAC) layer unit.

The abstraction layer may include a hardware abstraction layer (HAL) and an operating system abstraction layer (OSAL).

The middleware layer may support a transfer control protocol/internet protocol (TCP/IP) and an AVB protocol.

The first request signal may include information on an identifier (ID) of the AVB stream, information on a circular queue, and information related to a transmission frame.

The initialization operation may include an operation of configuring a descriptor used for identifying the AVB stream, an operation of configuring a buffer for each AVB stream, an operation of configuring a shaping parameter, and an initialization operation of a frame header.

In the obtaining a buffer, a start index indicating buffer blocks used for the transmission of the AVB stream may be obtained.

The third request signal may include a descriptor of the AVB stream, a start index of buffer blocks used for the transmission of the AVB stream, and a number of the buffer blocks.

In the finalizing the transmission of the AVB stream, the buffer and a shaping parameter for the transmission of the AVB stream may be released.

Further, in accordance with the forms of the present disclosure, a reception method performed by a communication node in an Ethernet-based vehicle network may be provided. The communication node includes a hardware layer, an abstraction layer, a middleware layer, and an application layer. The reception method may comprise performing, by the hardware layer, an initialization operation for reception of an audio video bridging (AVB) stream based on a first request signal from the abstraction layer; performing, by the hardware layer, an operation of obtaining a buffer for the reception of the AVB stream based on a second request signal from the abstraction layer; performing, by the hardware layer, an operation of accessing the AVB stream stored in the buffer based on a third request signal from the abstraction layer; performing, by the hardware layer, the reception of the AVB stream from the buffer based on a fourth request signal from the abstraction layer; and performing, by the hardware layer, an operation of finalizing the reception of the AVB stream based on a fifth request signal from the abstraction layer.

The hardware layer may include a physical (PHY) layer unit and a medium access control (MAC) layer unit.

The abstraction layer may include a hardware abstraction layer (HAL) and an operating system abstraction layer (OSAL).

The middleware layer may support a transfer control protocol/internet protocol (TCP/IP) and an AVB protocol.

The first request signal may include information on an identifier (ID) of the AVB stream, information on a circular queue, and information on a multicast address.

The initialization operation may include an operation of configuring a buffer for each AVB stream, and an operation of mapping an identifier of the AVB stream to a descriptor of the AVB stream.

The second request signal may include a descriptor of the AVB stream, a start index of buffer blocks used for the reception of the AVB stream, and information on a size of the AVB stream.

The third request signal may include a descriptor of the AVB stream and an index of buffer blocks in which the AVB stream to be received is located.

The fourth request signal may include a descriptor of the AVB stream, and information on a number of buffer blocks in which the AVB stream to be received is located.

In the finalizing the reception of the AVB stream, the buffer for the reception of the AVB stream is released, and the mapping between an identifier of the AVB stream and a descriptor of the AVB stream is released.

According to the forms of the present disclosure, a communication node including an operating system abstraction layer (OSAL) and a hardware abstraction layer (HAL) may be provided. The communication node may operate based on a plurality of operating systems, and independency between the operating systems can be guaranteed by using the OSAL. Also, the communication node may include various hardware, and independency between the various hardware can be guaranteed by using the HAL. Therefore, performance of a vehicle network can be enhanced.

BRIEF DESCRIPTION OF DRAWINGS

Forms of the present disclosure will become more apparent by describing in detail forms of the present disclosure with reference to the accompanying drawings, in which.

Figure 1:
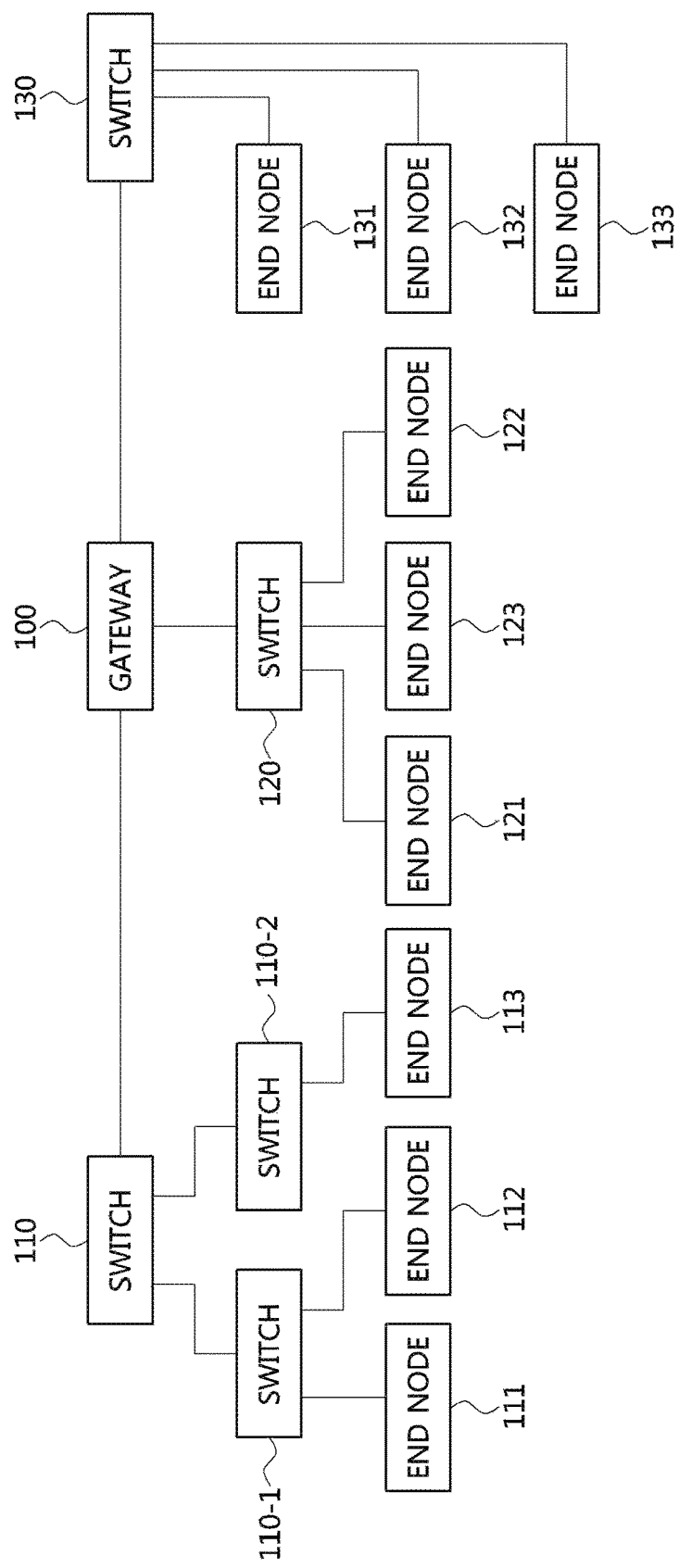
FIG. 1 is a diagram showing a vehicle network topology according to forms of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, forms of the present disclosure will be described in detail with reference to the accompanying drawings. As those skilled in the art would realize, the described forms may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Further, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific forms will be shown in the accompanying drawings and be described in detail in the detailed description. It should be understood, however, that it is not intended to limit the present disclosure to the specific forms but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term 'and/or' means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a diagram showing a vehicle network topology according to forms of the present disclosure.

As shown in FIG. 1, a communication node included in the vehicle network may be a gateway, a switch (or bridge), or an end node. The gateway 100 may be connected with at least one switch 110, 110-1, 110-2, 120, and 130 and may be configured to connect different networks. For example, the gateway 100 may support connection between a switch which supports a controller area network (CAN) (e.g., FlexRay, media oriented system transport (MOST), or local interconnect network (LIN)) protocol and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of end nodes 111, 112, 113, 121, 122, 123, 131, 132, and 133 connected to the switch.

The end nodes 111, 112, 113, 121, 122, 123, 131, 132, and 133 may include an electronic control unit (ECU) configured to control various types of devices mounted within a vehicle. For example, the end nodes 111, 112, 113, 121, 122, 123, 131, 132, and 133 may include the ECU included in an infotainment device (e.g., a display device, a navigation device, and an around view monitoring device).

The communication nodes (e.g., a gateway, a switch, an end node, or the like) included in the vehicle network may be connected in a star topology, a bus topology, a ring topology, a tree topology, a mesh topology, or the like. In addition, the communication nodes of the vehicle network may support the CAN protocol, the FlexRay protocol, the MOST protocol, the LIN protocol, or the Ethernet protocol. Forms of the present disclosure may be applied to the foregoing network topologies. The network topology to which forms of the present disclosure may be applied is not limited thereto and may be configured in various ways.

Figure 2:
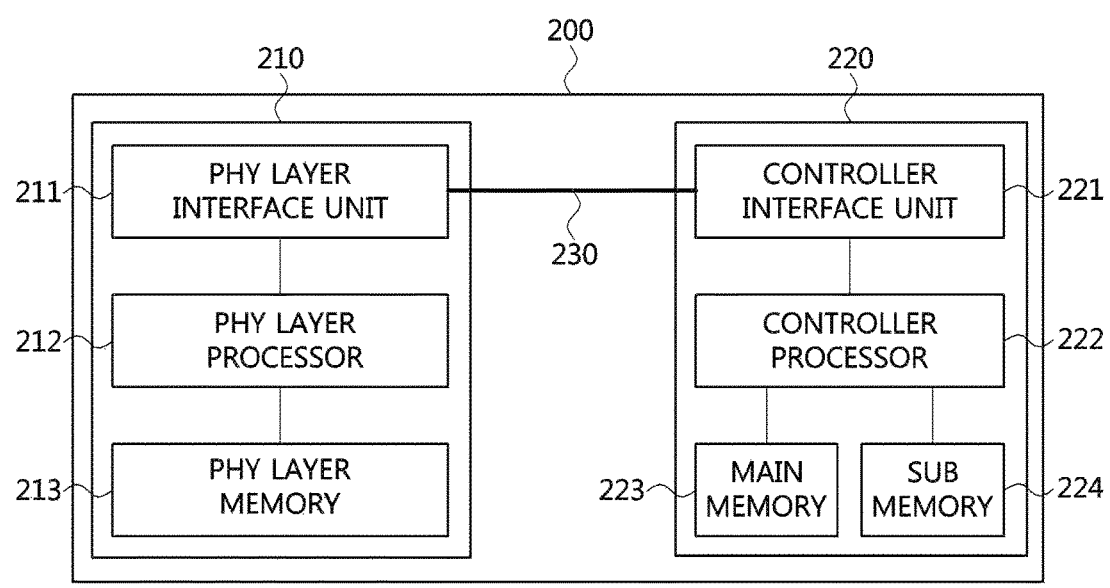
FIG. 2 is a diagram showing a communication node constituting a vehicle network according to forms of the present disclosure.

FIG. 2 is a diagram showing a communication node constituting a vehicle network according to forms of the present disclosure. Notably, the various methods discussed herein below may be executed by a controller having a processor and a memory.

As shown in FIG. 2, a communication node 200 of a network may include a PHY layer unit 210 and a controller unit 220. In addition, the communication node 200 may further include a regulator (not shown) for supplying power. In particular, the controller unit 220 may be implemented to include a medium access control (MAC) layer. A PHY layer unit 210 may be configured to receive or transmit signals from or to another communication node. The controller unit 220 may be configured to control the PHY layer unit 210 and perform various functions (e.g., an infotainment function, or the like.). The PHY layer unit 210 and the controller unit 220 may be implemented as one system on chip (SoC), or alternatively may be implemented as separate chips.

Further, the PHY layer unit 210 and the controller unit 220 may be connected via a media independent interface (MII) 230. The MII 230 may include an interface defined in the IEEE 802.3 and may include a data interface and a management interface between the PHY layer unit 210 and the controller unit 220. One of a reduced MII (RMII), a gigabit MII (GMII), a reduced GMII (RGMII), a serial GMII (SGMII), a 10 GMII (XGMII) may be used instead of the MII 230. A data interface may include a transmission channel and a reception channel, each of which may have an independent clock, data, and a control signal. The management interface may include a two-signal interface, one signal for the clock and one signal for the data.

Particularly, the PHY layer unit 210 may include a PHY layer interface unit 211, a PHY layer processor 212, and a PHY layer memory 213. The configuration of the PHY layer unit 210 is not limited thereto, and the PHY layer unit 210 may be configured in various ways. The PHY layer interface unit 211 may be configured to transmit a signal received from the controller unit 220 to the PHY layer processor 212 and transmit a signal received from the PHY layer processor 212 to the controller unit 220. The PHY layer processor 212 may be configured to execute operations of the PHY layer interface unit 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller unit 220 may be configured to monitor and control the PHY layer unit 210 using the MII 230. The controller unit 220 may include a controller interface unit 221, a controller processor 222, a main memory 223, and a sub memory 224. The configuration of the controller unit 220 is not limited thereto, and the controller unit 220 may be configured in various ways. The controller interface unit 221 may be configured to receive a signal from the PHY layer unit 210 (e.g., the PHY layer interface unit 211) or an upper layer (not shown), transmit the received signal to the controller processor 222, and transmit the signal received from the controller processor 222 to the PHY layer unit 210 or upper layer. The controller processor 222 may further include an independent memory control logic or an integrated memory control logic for controlling the controller interface unit 221, the main memory 223, and the sub memory 224. The memory control logic may be implemented to be included in the main memory 223 and the sub memory 224 or may be implemented to be included in the controller processor 222.

Further, each of the main memory 223 and the sub memory 224 may be configured to store a signal processed by the controller processor 222 and may be configured to output the stored signal based on a request from the controller processor 222. The main memory 223 may be a volatile memory (e.g., a random access memory (RAM)) configured to temporarily store data required for the operation of the controller processor 222. The sub memory 224 may be a non-volatile memory in which an operating system code (e.g., a kernel and a device driver) and an application program code for performing a function of the controller unit 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

A method performed by a communication node and a corresponding counterpart communication node in a vehicle network will be described below. Although the method (e.g., signal transmission or reception) performed by a first communication node will be described below, the method is applicable to a second communication node that corresponds to the first communication node. In other words, when an operation of the first communication node is described, the second communication node corresponding thereto may be configured to perform an operation that corresponds to the operation of the first communication node. Additionally, when an operation of the second communication node is described, the first communication node may be configured to perform an operation that corresponds to an operation of a switch.

Figure 3:
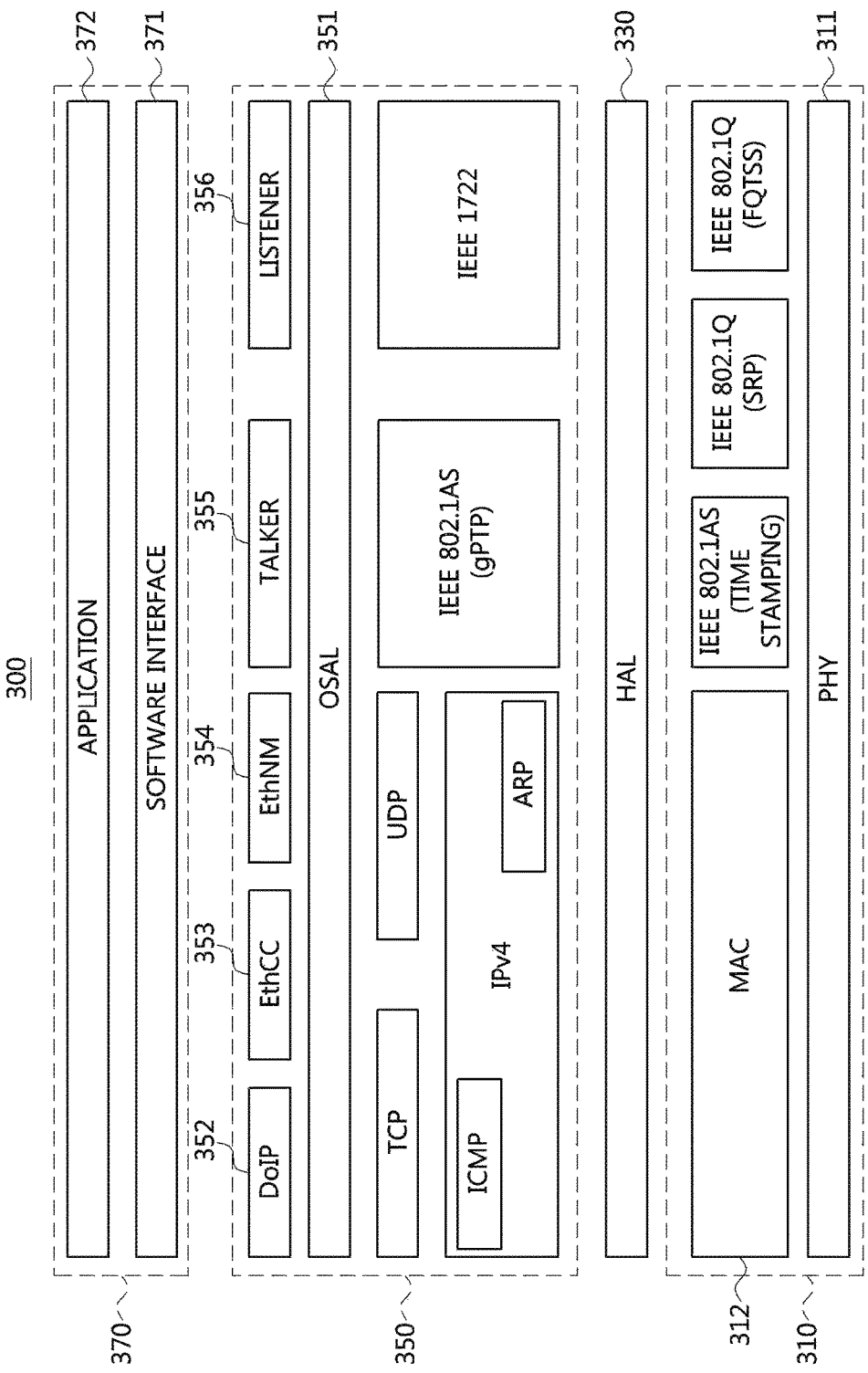
FIG. 3 is a detailed block diagram illustrating a communication node constituting a vehicle network according to forms of the present disclosure.

FIG. 3 is a detailed block diagram illustrating a communication node constituting a vehicle network according to forms of the present disclosure.

Referring to FIG. 3, a communication node 300 may comprise a hardware layer 310, a hardware abstraction layer (HAL) 330, a middleware layer 350, and an application layer 370. The hardware layer 310 may comprise a PHY layer unit 311 and a MAC layer unit 312. Here, the PHY layer unit 311 may support an Ethernet protocol, and may correspond to the PHY layer unit 210 explained referring to FIG. 2. The MAC layer unit 312 may also support an Ethernet protocol (e.g. IEEE802.3, or the like.), and may correspond to the controller unit 220 explained referring to FIG. 2.

The hardware layer 310 may support an audio video bridging (AVB) protocol. For example, the hardware layer 310 may support an IEEE 802.1AS time stamping protocol, an IEEE 802.1Q stream reservation protocol (SRP), an IEEE 802.1Q forwarding & queuing for time-sensitive stream (FQTSS) protocol, or the like. The IEEE 802.1AS time stamping protocol may support operations for stamping times at which transmission and reception of frames are performed according to the IEEE 802.1AS. The IEEE 802.1Q SRP may support a reservation operation of a stream resource, a reservation operation of a traffic shaper, or the like. The IEEE 802.1Q FQTSS protocol may support a shaping operation of frames being transmitted, or the like. The hardware layer 310 may support the HAL 330 so that the middleware layer 350 can operate.

The hardware layer 310 may support three modes. For example, the hardware layer 310 may support a normal node, a sleep mode, and a power-off mode. In the normal mode, Ethernet communications can be performed. When the hardware layer 310 is in the normal mode, the PHY layer unit 311 may operate in a normal mode (e.g. a state in which an INH pin is in active state), and the MAC layer unit 312 may operate in an active mode (e.g. a state in which frames can be transmitted and received). In the sleep mode, Ethernet communication may be performed restrictively with consuming minimal power. When the hardware layer 310 is in the sleep mode, the PHY layer unit 311 may operate in a sleep mode (e.g. a state in which the INH pin is in inactive state). Also, when a remote event is detected, the PHY layer unit 311 may wake up. Also, the MAC layer unit 312 may operate in inactive mode (e.g. a state in which frames cannot be transmitted or received), and may wake up when a local event is detected.

When the hardware layer 310 is in the power-off mode, the PHY layer unit 311 may operate in a sleep mode (e.g. a state in which the INH pin is in inactive state). When a remote event is detected, the PHY layer unit 311 may wake up. Also, the MAC layer unit 312 may operate in inactive mode, and power may not be supplied to the MAC layer unit 312. That is, the MAC layer unit 312 may not wake up according to a local event. The structure of the hardware layer 310 may not be limited to the above-described example. That is, the hardware layer 310 may be configured variously.

The HAL 330 may be located between the hardware layer 310 and the middleware layer 350, and be used for guaranteeing independency of various hardware layers. The HAL 330 may be configured as a unit independent from an operating system abstraction layer (OSAL) 350 which will be described later, or may be configured as a single unit integrated with the OSAL 351.

The middleware layer 350 may comprise an IP middleware layer operating based on transfer control protocol and internet protocol (TCP/IP), an AVB middleware layer operating based on the AVB protocol, and the OSAL 351. The IP middleware layer may include a diagnostic over internet protocol (DoIP) unit 352, an EthCC unit 353, an EthNM unit 354, or the like. The DoIP unit 352 may be configured to perform diagnostic communications. The EthCC unit 353 may be configured to transmit and receive a control frame. The EthNM unit 354 may be configured to perform network managements. The IP middleware layer may support IPv4, internet control message protocol (ICMP), address resolution protocol (ARP), TCP, user datagram protocol (UDP), or the like.

The AVB middleware layer may include a talker unit 355, a listener unit 356, or the like. The talker unit 355 may be configured to perform transmission of an AVB stream based on the AVB protocol. The listener unit 356 may be configured to perform reception of an AVB stream based on the AVB protocol. The AVB middleware layer may support an IEEE 802.1AS generalized precision time protocol (gPTP), and an IEEE 1722 AVB transport protocol (AVTP). The IEEE 802.1AS gPTP may support operation for selecting a grand master based on a best master clock algorithm (BMCA), operation for clock synchronization, operation for link delay calculations, or the like. The IEEE 1722 AVTP may support operations for generating an Ethernet frame including an audio data unit and/or a video data unit.

The application layer 370 may include a software interface 371 and an application 372. The software interface 371 may support input and output operations for signals for the application 372. The application 372 may be an application operating based on TCP/IP or an application operating based on the AVB protocol.

Figure 4:
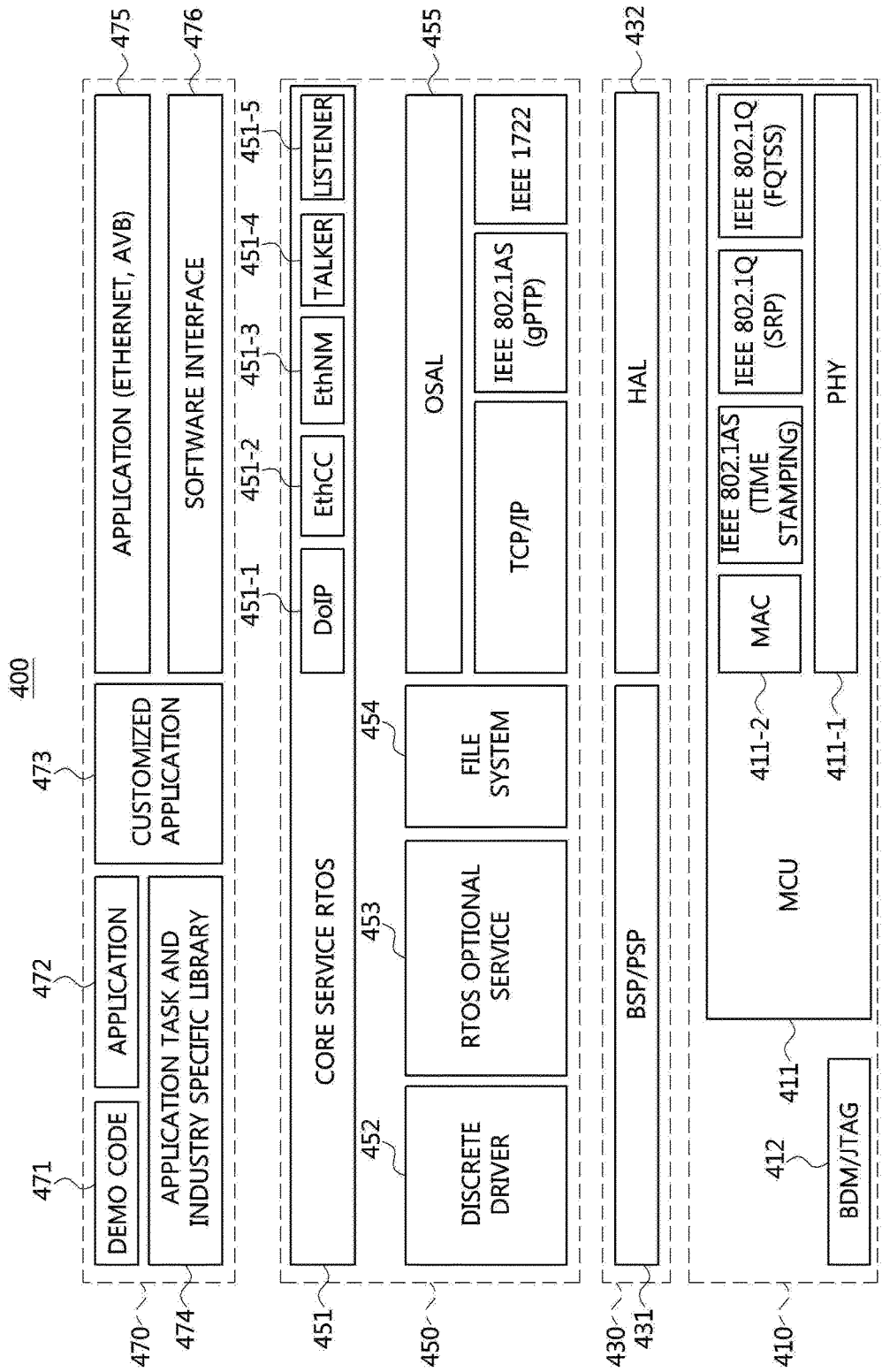
FIG. 4 is another detailed block diagram illustrating a communication node constituting a vehicle network according to forms of the present disclosure.

FIG. 4 is another detailed block diagram illustrating a communication node constituting a vehicle network according to forms of the present disclosure.

Referring to FIG. 4, a communication node 400 may comprise a hardware layer 410, a hardware interface layer 430, a middleware layer 450, and an application layer 470. The hardware layer 410, hardware interface layer 430, middleware layer 450, and the application layer 470 may respectively correspond to the hardware layer 310, the HAL 330, the middleware layer 350, and the application layer 370 which were explained referring to FIG. 3.

The hardware layer 410 may include a micro controller unit (MCU) 411, a background debug mode (BDM) interface/joint test action group (JTAG) 412, or the like. The MCU 411 may include a PHY layer unit 411-1 and a MAC layer unit 411-2. Each of the PHY layer unit 411-1 and the MAC layer unit 411-2 may correspond to each of the PHY layer unit 311 and the MAC layer unit 312 which were explained referring to FIG. 3. The MCU 411 may support the IEEE 802.1AS time stamping protocol, IEEE 802.1Q SRP, and IEEE 802.1Q FQTSS protocol, or the like.

The hardware interface layer 430 may include a board support package/processor support package (BSP/PSP) 431, a HAL 432, or the like. Here, the HAL 432 may correspond to the HAL 330 which was explained referring to FIG. 3.

The middleware layer 450 may include a core service real time operation system (RTOS) 451, a discrete driver 452, a RTOS optional service 453, a file system 454, an OSAL 455, or the like. The middleware layer 450 may support TCP/IP related protocols such as IPv4, ICMP, ARP, TCP, and UDP, IEEE 802.1AS gPTP, IEEE 1722 AVTP, or the like. The core service RTOS 451 may include a DoIP unit 451-1, an EthCC unit 451-2, an EthNM unit 451-3, a talker unit 451-4, a listener unit 451-5, or the like. Here, each of the DoIP unit 451-1, EthCC unit 451-2, EthNM unit 451-3, talker unit 451-4, and listener unit 451-5 may correspond to each of the DoIP unit 352, EthCC unit 353, EthNM unit 354, talker unit 355, and listener unit 356 which were explained referring to FIG. 3.

The application layer 470 may include a demo code 471, an application 472, a customized application 473, an application task and industry specific library 474, an application (Ethernet, AVB) 475, a software interface 476, or the like. Each of the application 475 and software interface 476 may correspond to each of the application 372 and software interface 371 which were explained referring to FIG. 3.

Figure 5:
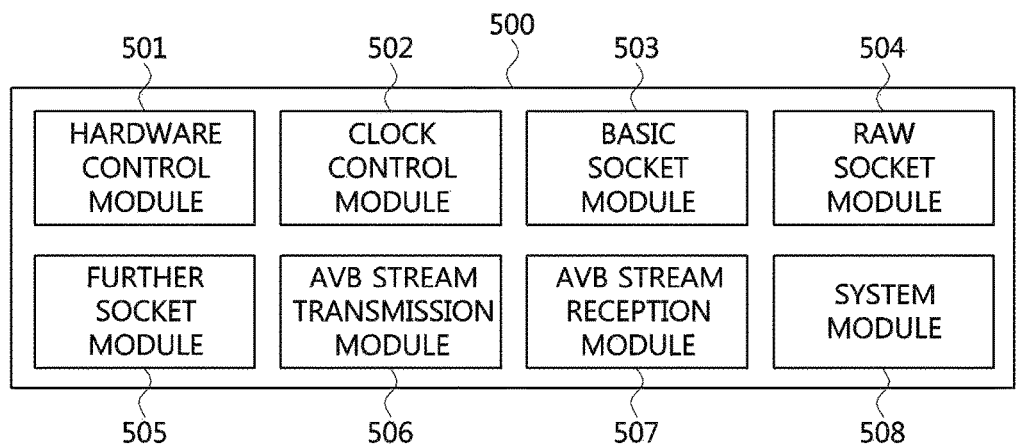
FIG. 5 is a block diagram illustrating an abstraction layer according to an example form of the present disclosure.

FIG. 5 is a block diagram illustrating an abstraction layer according to an example form of the present disclosure.

Referring to FIG. 5, an abstraction layer 500 may correspond to each of the HAL 330 and OSAL 350 which were explained referring to FIG. 3, or correspond to a layer including the HAL 330 and OSAL 350 both. Alternatively, the abstraction layer 500 may correspond to each of the HAL 432 and OSAL 455 which were explained referring to FIG. 4, or correspond to a layer including the HAL 432 and OSAL 455 both. The abstraction layer 500 may include a hardware control module 501, a clock control module 502, a basic socket module 503, a raw socket module 504, a further socket module 505, an AVB stream transmission module 506, an AVB stream reception module 507, a system module 508, or the like.

The hardware control module 501 may be configured to perform operations for controlling operation modes of hardware (e.g. the PHY layer unit 210, 311, or 411-1, and the MAC layer unit 220, 312, or 411-2). The clock control module 502 may be configured to perform clock control operations. The basic socket module 503 may be configured to perform socket interface management operations for transmission and reception of data in layer 3 or above. The raw socket module 504 may be configured to perform operations for a raw socket preconfigured for prompt processing of data in layer 2 or below. The further socket module 505 may be configured to perform operations for setting a network byte order to support a socket configured beforehand. The AVB stream transmission module 506 may be configured to perform control operations for a handler and a buffer (or, memory) for transmission of an AVB stream. The AVB stream reception module 507 may be configured to perform control operations of a handler and a buffer for reception of an AVB stream. The system module 508 may be configured to perform common standardized operations used in the middleware layer.

Hereinafter, a procedure for setting an operation mode of a hardware layer, a procedure for identifying an operation mode of the hardware layer, a procedure for identifying an error state of the hardware layer, and a procedure for resetting the hardware layer, performed in a communication node including the abstraction layer 500, will be described. Here, the hardware layer may be one of the PHY layer unit and the MAC layer unit.

Figure 6:
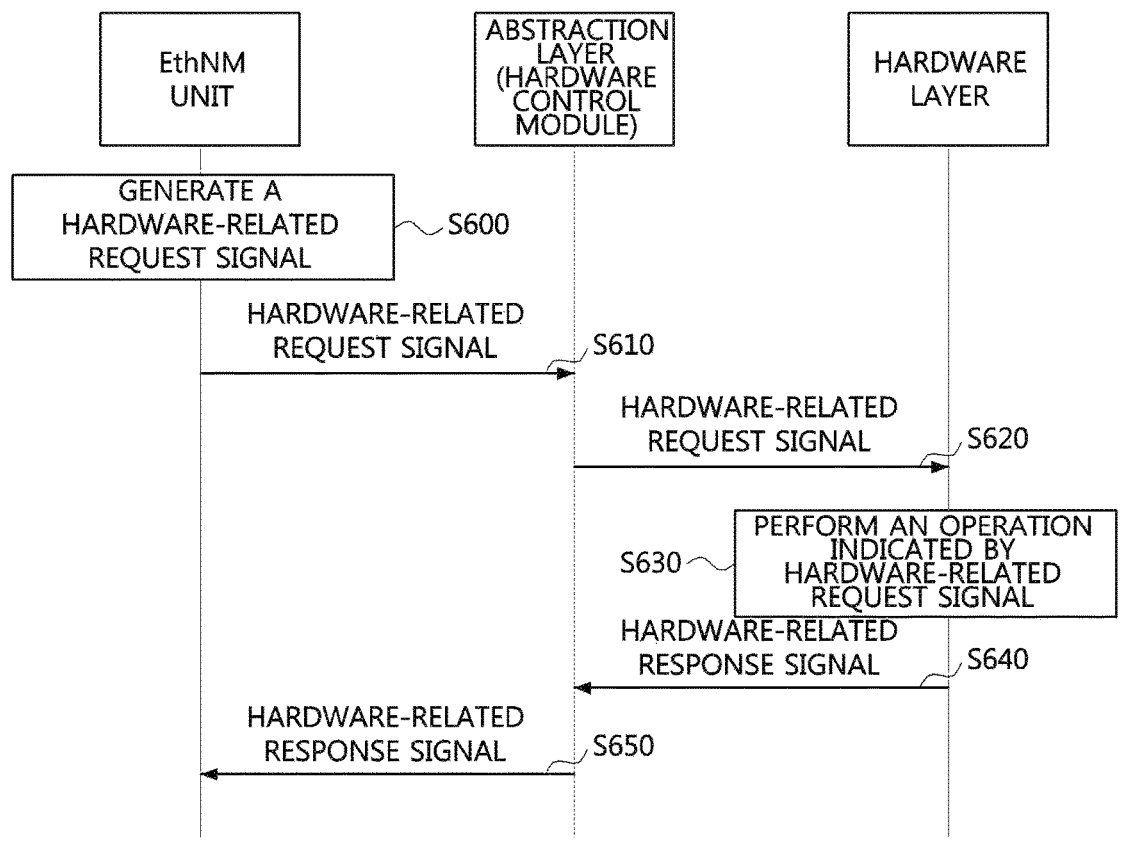
FIG. 6 is a sequence chart illustrating an operation method of a communication node according to a first example form of the present disclosure.

FIG. 6 is a sequence chart illustrating an operation method of a communication node according to a first example form of the present disclosure.

Referring to FIG. 6, an EthNM unit may correspond to the EthNM unit 354 explained referring to FIG. 3 or the EthNM unit 451-3 explained referring to FIG. 4. Also, an abstraction layer may correspond to the abstraction layer 500 (e.g. the hardware control module 501) explained referring to FIG. 5. Here, a hardware layer may correspond to the hardware layer 310 explained referring to FIG. 3, or the hardware layer 410 explained referring to FIG. 4.

In a procedure for setting an operation mode of the hardware layer, the EthNM unit may generate a hardware-related request signal requesting to set an operation mode of the hardware layer (S600). The hardware-related request signal may include information indicating an operation mode. For example, in case that the information indicating the operation mode is set to a hexadecimal number (e.g. '0'), this may indicate that the operation mode is set to the normal mode. Also, in case that the information indicating the operation mode is set to a hexadecimal number (e.g. '1'), this may indicate that the operation mode is set to the sleep mode. Here, each of the normal mode and the sleep mode may correspond to each of the normal mode and the sleep mode explained referring to FIG. 3. The information indicating the operation mode may be configured variously without being restricted to the above-described examples. The EthNM unit may transmit the generated hardware-related request signal to the abstraction layer (S610).

The abstraction layer may receive the hardware-related request signal from the EthNM unit, and transmit the received hardware-related request signal to the hardware layer (S620). The hardware layer may receive the hardware-related request signal, and perform an operation indicated by the received hardware-related request signal (S630). For example, in case that the information indicating the operation mode included in the hardware-related request signal is set to the hexadecimal number '0', the hardware layer may configure its operation mode to the normal mode. In case that the information indicating the operation mode included in the hardware-related request signal is set to the hexadecimal number '1', the hardware layer may configure its operation mode to the sleep mode. In these cases, the hardware layer may configure its operation mode based on the information indicating the operation mode irrespectively of its previous operation mode.

After completion of setting the operation mode, the hardware layer may generate a hardware-related response signal indicating the completion of setting the operation mode. The hardware-related response signal may further include information indicating an error state of the hardware layer. For example, in case that the information indicating the error state is set to a hexadecimal number '0', this may indicate that no error occurs in the hardware layer. In case that the information indicating the error state is set to a hexadecimal number (e.g. '0x80000000'), this may indicate that an unknown error occurs in the hardware layer. In case that the information indicating the error state is set to one of hexadecimal numbers (e.g. '0x00000001' to '0x7FFFFFFF'), this may indicate that a known error occurs in the hardware layer. Also, each number of the above range (e.g. '0x00000001' to '0x7FFFFFFF') may indicate different error. The information indicating the error state may be configured variously without being limited to the above-described examples.

The hardware layer may transmit the generated hardware-related response signal to the abstraction layer (S640). The abstraction layer may receive the hardware-related response signal, and transmit the received hardware-related response signal to the EthNM unit (S650). When the EthNM unit receives the hardware-related response signal from the abstraction layer, the EthNM unit may determine that the operation mode of the hardware layer is set to the operation mode (e.g. normal mode or sleep mode) indicated by the hardware-related request signal. In addition, in case that the hardware-related response signal includes the information indicating the error state, the EthNM unit may identify the error state of the hardware layer based on the information.

In a procedure for identifying an operation mode of the hardware layer, the EthNM unit may generate a hardware-related request signal requesting to identify an operation mode of the hardware layer (S600), and transmit the generated hardware-related request signal to the abstraction layer (S610). The abstraction layer may receive the hardware-related request signal from the EthNM unit, and transmit the received hardware-related request signal to the hardware layer (S620).

The hardware layer may receive the hardware-related request signal, and perform an operation indicated by the received hardware-related request signal (S630). For example, the hardware layer having received the hardware-related request signal may identify that the identification of the operation mode is requested, and generate a hardware-related response signal including information indicating its current operation mode. In case that the information indicating the operation mode is configured as a hexadecimal number (e.g. '0'), this may indicate that the current operation mode the hardware layer is the normal mode. In case that the information indicating the operation mode is configured as a hexadecimal number (e.g. '1'), this may indicate that the current operation mode of the hardware layer is the sleep mode.

Also, the hardware-related response signal may further include information indicating an error state of the hardware layer. For example, in case that the information indicating the error state is set to a hexadecimal number '0', this may indicate that no error occurs in the hardware layer. In case that the information indicating the error state is set to a hexadecimal number (e.g. '0x80000000'), this may indicate that an unknown error occurs in the hardware layer. In case that the information indicating the error state is set to one of hexadecimal numbers (e.g. '0x00000001' to '0x7FFFFFFF'), this may indicate that a known error occurs in the hardware layer. Also, each number of the above range (e.g. '0x00000001' to '0x7FFFFFFF') may indicate different error.

The hardware layer may transmit the hardware-related response signal to the abstraction layer (S640). The abstraction layer may receive the hardware-related response signal, and transmit the received hardware-related response signal to the EthNM unit (S650). The EthNM unit may receive the hardware-related response signal from the abstraction layer. In case that the information indicating the operation mode, which is included in the hardware-related response signal, is configured as '0', the EthNM unit may identify that the hardware layer is operating in the normal mode. In case that the information indicating the operation mode, which is included in the hardware-related response signal, is configured as '1', the EthNM unit may identify that the hardware layer is in the sleep mode. Also, in case that the hardware-related response signal includes the information indicating an error state of the hardware layer, the EthNM unit may identify the error state of the hardware layer based on the information indicating the error state.

Meanwhile, in a procedure for identifying an error state of the hardware layer, the EthNM unit may generate a hardware-related request signal requesting to identify an error state of the hardware layer (S600), and transmit the generated hardware-related request signal to the abstraction layer (S610). The abstraction layer may receive the hardware-related request signal from the EthNM unit, and transmit the received hardware-related request signal to the hardware layer (S620).

The hardware layer may receive the hardware-related request signal, and perform an operation indicated by the received hardware-related request signal (S630). For example, the hardware layer having received the hardware-related request signal may identify that the identification of the error state is requested, and generate a hardware-related response signal including information indicating its error state. In case that the information indicating the error state is configured as a hexadecimal number (e.g. '0'), this may indicate that no error occurs in the hardware layer. In case that the information indicating the error state is set to a hexadecimal number (e.g. '0x80000000'), this may indicate that an unknown error occurs in the hardware layer. In case that the information indicating the error state is set to one of hexadecimal numbers (e.g. '0x00000001' to '0x7FFFFFFF'), this may indicate that a known error occurs in the hardware layer. Also, each number of the above range (e.g. '0x00000001' to '0x7FFFFFFF') may indicate different error.

The hardware layer may transmit the hardware-related response signal to the abstraction layer (S640). The abstraction layer may receive the hardware-related response signal, and transmit the received hardware-related response signal to the EthNM unit (S650). The EthNM unit may receive the hardware-related response signal from the abstraction layer. In case that the information indicating the error state is configured as a hexadecimal number (e.g. '0'), the EthNM unit may identify that no error occurs in the hardware layer. In case that the information indicating the error state is set to a hexadecimal number (e.g. '0x80000000'), the EthNM unit may identify that an unknown error occurs in the hardware layer. In case that the information indicating the error state is set to one of hexadecimal numbers (e.g. '0x00000001' to '0x7FFFFFFF'), the EthNM unit may identify an error indicated by the information occurs in the hardware layer.

Meanwhile, in a procedure for resetting the hardware layer, the EthNM unit may generate a hardware-related request signal requesting to reset the hardware layer (S600). The procedure for resetting the hardware layer may be performed when an unknown error occurs in the hardware layer. The EthNM unit may transmit the hardware-related request signal to the abstraction layer (S610). The abstraction layer may receive the hardware-related request signal from the EthNM unit, and transmit the received hardware-related request signal to the hardware layer (S620).

The hardware layer may receive the hardware-related request signal, and perform an operation indicated by the received hardware-related request signal (S630). For example, the hardware layer having received the hardware-related request signal may identify that the resetting of the hardware layer is requested, and accordingly perform the resetting operation for the hardware layer. After completion of the resetting operation, the hardware layer may generate a hardware-related response signal indicating that the resetting operation has been completed. Also, the hardware-related response signal may include information indicating an error state of the hardware layer. For example, in case that the information indicating the error state is set to a hexadecimal number '0', this may indicate that no error occurs in the hardware layer. In case that the information indicating the error state is set to a hexadecimal number (e.g. '0x80000000'), this may indicate that an unknown error occurs in the hardware layer. In case that the information indicating the error state is set to one of hexadecimal numbers (e.g. '0x00000001' to '0x7FFFFFFF'), this may indicate that a known error exists in the hardware layer. Also, each number of the above range (e.g. '0x00000001' to '0x7FFFFFFF') may indicate different error.

The hardware layer may transmit the hardware-related response signal to the abstraction layer (S640). The abstraction layer may receive the hardware-related response signal, and transmit the received hardware-related response signal to the EthNM unit (S650). When the hardware-related response signal is received from the abstraction layer, the EthNM unit may identify that the hardware layer has been reset. Also, when the hardware-related response signal includes information indicating the error state, the EthNM unit may identify the error state of the hardware layer based on the information indicating the error state.

Hereinafter, a procedure for initializing a clock, a procedure for requesting to stop using of the clock, a procedure for obtaining time information of the clock, a procedure for setting time information of the clock, a procedure for storing error information of the clock, a procedure for obtaining error information of the clock, and a procedure for deleting the stored error information of the clock, which are performed in a communication node including the abstraction layer 500, will be described.

Figure 7:
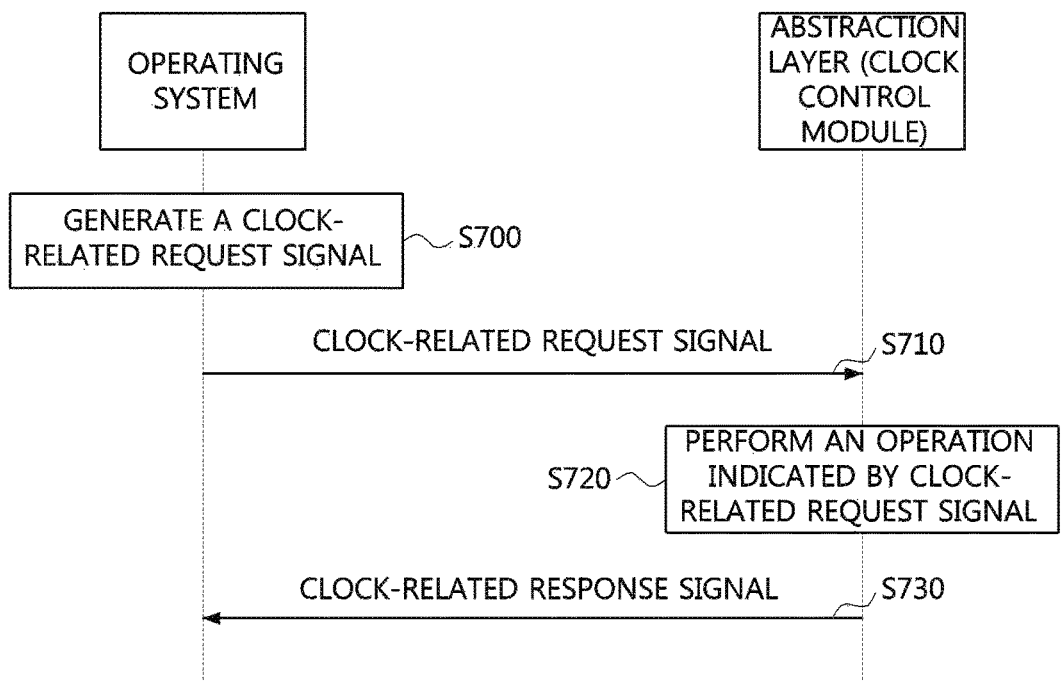
FIG. 7 is a sequence chart illustrating an operation method of a communication node according to a second example form of the present disclosure.

FIG. 7 is a sequence chart illustrating an operation method of a communication node according to a second example form of the present disclosure.

Referring to FIG. 7, an operating system may be one of a plurality of operating systems included in a communication node. An abstraction layer may correspond to the abstraction layer 500 (e.g. the clock control module 502) explained referring to FIG. 5. It will be explained that the clock related procedures are performed by the operating system in the below description. However, instead of the operating system, an application may perform the clock related procedures.

In a procedure for initializing a clock, the operating system (or, application) may generate a clock-related request signal requesting to initialize a PTP clock (S700), and transmit the generated clock-related request signal to the abstraction layer (S710). The abstraction layer may receive the clock-related request signal from the operating system, and perform an operation indicated by the received clock-related request signal (S720). For example, the abstraction layer having received the clock-related request signal may identify that the initialization of the PTP clock is requested, and accordingly perform an initialization operation of the PTP clock. Also, the abstraction layer may register the operating system having transmitted the clock-related request signal to a predetermined list recording operating systems using the clock.

The abstraction layer may generate a clock-related response signal. The clock-related response signal may include information indicating completion of the initialization operation of the PTP clock. In case that the information indicating the completion of the PTP clock initialization operation is configured as a hexadecimal number '0', this may indicate the successful completion of the PTP clock initialization operation. In case that the information indicating the completion of the PTP clock initialization operation is configured as a hexadecimal number '1', this may indicate that the PTP clock initialization operation has not been successfully completed. The abstraction layer may transmit the generated clock-related response signal to the operating system (S730).

The operating system may receive the clock-related response signal which is a response to the clock-related request signal from the abstraction layer. In case that the information indicating whether the PTP clock initialization operation is completed which is included in the clock-related response signal is configured as '0', the operating system may identify that the PTP clock initialization operation has been successfully completed. On the contrary, in case that the information is configured as '1', the operating system may identify that the PTP clock initialization operation has not been successfully completed.

Meanwhile, in a procedure for requesting to stop using the clock, the operating system (or, application) may generate a clock-related request signal requesting to stop the clock use (S700), and transmit the generated clock-related request signal to the abstraction layer (S710). The abstraction layer may receive the clock-related request signal from the operating system, and perform an operation indicated by the received clock-related request signal (S720). For example, the abstraction layer having received the clock-related request signal may identify that the stopping of use of the PTP clock is requested, and accordingly stop using the PTP clock. Also, the abstraction layer may delete the operating system having transmitted the clock-related request signal from the predetermined list.

The abstraction layer may generate a clock-related response signal. The clock-related response signal may include information indicating whether the operation indicated by the clock-related request signal is completed or not. In case that the information indicating whether the instructed operation is completed is configured as '0', this may indicate that the operation indicated by the clock-related request signal has been successfully completed. In case that the information indicating whether the instructed operation is completed is configured as '1', this may indicate that the operation instructed by the clock-related request signal has not been successfully completed. The abstraction layer may transmit the generated clock-related response signal to the operating system (S730).

The operating system may receive the clock-related response signal which is a response to the clock-related request signal from the abstraction layer. In case that the information indicating whether the instructed operation is completed which is included in the clock-related response signal is configured as '0', the operating system may identify that the use of the PTP clock has been stopped. On the contrary, in case that the information is configured as '1', the operating system may identify that the use of the PTP clock has not been stopped.

Meanwhile, in a procedure for obtaining time information of the clock, the operating system may generate a clock-related request signal requesting the time information of the PTP clock (S700). Also, the clock-related request signal may further request error information of the PTP clock (e.g. an error flag). The operating system may transmit the clock-related request signal to the abstraction layer (S710). The abstraction layer may receive the clock-related request signal from the operating system, and perform an operation indicated by the received clock-related request signal (S720). For example, the abstraction layer having received the clock-related request signal may identify that the time information of the PTP clock is requested, and accordingly generate the time information of the PTP clock. The time information of the PTP clock may be represented with 96 bits. 64 bits among 96 bits may indicate information on second, and 32 bits among 96 bits may indicate information on nanosecond. The time information of the PTP clock may be variously configured without being limited to the above-described example. Also, the abstraction layer may identify that error information of the PTP clock is requested, and accordingly generate the error information of the PTP clock. The error information of the PTP clock may indicate whether a 'jump' exists in the PTP clock or not and a cause of the jump. The cause of the jump may be represented with 32 bits. The error information may be variously configured without being limited to the above-described example.

The abstraction layer may generate a clock-related response signal. The clock-related response signal may include time information of the PTP clock, error information of the PTP clock, and information on whether the operation indicated by the clock-related request signal has been successfully completed. In case that the information indicating whether the instructed operation is completed is configured as '0', this may indicate that the operation indicated by the clock-related request signal has been successfully completed. In case that the information indicating whether the instructed operation is completed is configured as '1', this may indicate that the operation instructed by the clock-related request signal has not been successfully completed. The abstraction layer may transmit the generated clock-related response signal to the operating system (S730).

The operating system may receive the clock-related response signal which is a response to the clock-related request signal from the abstraction layer. In case that the information indicating whether the instructed operation is completed which is included in the clock-related response signal is configured as '0', the operating system may identify that the instructed operation has been completed. On the contrary, in case that the information is configured as '1', the operating system may identify that the instructed operation has not been completed. Also, the operating system may obtain the time information of the PTP clock included in the clock-related response signal, and identify time indicated by the time information of the PTP clock. The operating system may obtain the error information of the PTP clock which is included in the clock-related response signal, and identify an error indicated by the obtained error information of the PTP clock.

Meanwhile, in a procedure for setting time information of the clock, the operating system may generate a clock-related request signal requesting to set the time information of the PTP clock (S700). The clock-related request signal may include time information of the PTP clock. The time information of the PTP clock may be represented with 96 bits. 64 bits among 96 bits may indicate information on second, and 32 bits among 96 bits may indicate information on nanosecond. The operating system may transmit the clock-related request signal to the abstraction layer (S710). The abstraction layer may receive the clock-related request signal from the operating system, and perform the operation indicated by the received clock-related request signal (S720). For example, the abstraction layer having received the clock-related request signal may identify that the setting of the time information is requested, and accordingly set the time information of the PTP clock based on the received time information.

The abstraction layer may generate a clock-related response signal. The clock-related response signal may include information on whether the operation instructed by the clock-related request signal has been completed. In case that the information indicating whether the time information setting operation is completed is configured as '0', this may indicate that the operation indicated by the clock-related request signal has been successfully completed. In case that the information indicating whether the time information setting operation is completed is configured as '1', this may indicate that the operation instructed by the clock-related request signal has not been successfully completed. The abstraction layer may transmit the generated clock-related response signal to the operating system (S730).

The operating system may receive the clock-related response signal which is a response to the clock-related request signal from the abstraction layer. In case that the information indicating whether the instructed operation is completed which is included in the clock-related response signal is configured as '0', the operating system may identify that the time information setting operation has been completed. On the contrary, in case that the information is configured as '1', the operating system may identify that the time information setting operation has not been completed.

Meanwhile, in a procedure for storing error information of the clock, the operating system may generate a clock-related request signal requesting to store the error information of the PTP clock (S700). The clock-related request signal may include error information of the PTP clock (e.g. error code). The error information of the PTP clock may include enumeration information indicating a cause of a jump existing in the PTP clock. The operating system may transmit the clock-related request signal to the abstraction layer (S710). The abstraction layer may receive the clock-related request signal from the operating system, and perform the operation instructed by the received clock-related request signal (S720). For example, the abstraction layer having received the clock-related request signal may identify that the storing of the error information is requested, and accordingly store information indicated by the error information of the PTP clock. The abstraction layer may perform an OR operation between current error information and previous error information, and store a result of the OR operation. Also, the abstraction layer may store time at which the error information is stored in a monotonic time format.

The abstraction layer may generate a clock-related response signal. The clock-related response signal may include information on whether the operation instructed by the clock-related request signal has been completed. In case that the information indicating whether the instructed operation is completed is configured as '0', this may indicate that the operation of storing the error information of the PTP clock indicated by the clock-related request signal has been successfully completed. In case that the information indicating whether the instructed operation is completed is configured as '1', this may indicate that the operation of storing the error information of the PTP clock instructed by the clock-related request signal has not been successfully completed. The abstraction layer may transmit the generated clock-related response signal to the operating system (S730).

The operating system may receive the clock-related response signal which is a response to the clock-related request signal from the abstraction layer. In case that the information indicating whether the instructed operation is completed which is included in the clock-related response signal is configured as '0', the operating system may identify that the operation of storing the error information of the PTP clock has been completed. On the contrary, in case that the information is configured as '1', the operating system may identify that the operation of storing the error information of the PTP clock has not been completed.

Meanwhile, in a procedure for obtaining error information of the clock, the operating system may generate a clock-related request signal requesting the error information of the PTP clock (S700). The clock-related request signal may include the error information of the PTP clock (e.g. error code). The operating system may transmit the clock-related request signal to the abstraction layer (S710). The abstraction layer may receive the clock-related request signal from the operating system, and perform the operation instructed by the received clock-related request signal (S720). For example, the abstraction layer having received the clock-related request signal may identify that the error information of the PTP clock is requested, and accordingly identify time at which an error indicated by the error information of the PTP clock occurs. The abstraction layer may generate time information indicating occurrence time information indicting the identified time.

The abstraction layer may generate a clock-related response signal. The clock-related response signal may include the occurrence time information, and information on whether the operation instructed by the clock-related request signal has been completed. In case that the information indicating whether the instructed operation is completed is configured as '0', this may indicate that the operation of obtaining the error information of the PTP clock indicated by the clock-related request signal has been successfully completed. In case that the information indicating whether the instructed operation is completed is configured as '1', this may indicate that the operation of obtaining the error information of the PTP clock instructed by the clock-related request signal has not been successfully completed. The abstraction layer may transmit the generated clock-related response signal to the operating system (S730).

The operating system may receive the clock-related response signal which is a response to the clock-related request signal from the abstraction layer. In case that the information indicating whether the instructed operation is completed which is included in the clock-related response signal is configured as '0', the operating system may identify that the operation of obtaining the error information of the PTP clock has been completed. On the contrary, in case that the information is configured as '1', the operating system may identify that the operation of obtaining the error information of the PTP clock has not been completed. Also, the operating system may identify the occurrence time information included in the clock-related response signal, and identify the time at which the error occurred which is indicated by the occurrence time information.

Meanwhile, in a procedure for deleting stored error information of the clock, the operating system may generate a clock-related request signal requesting to delete the stored error information of the PTP clock (S700). The clock-related request signal may include the error information of the PTP clock (e.g. error code). The operating system may transmit the clock-related request signal to the abstraction layer (S710). The abstraction layer may receive the clock-related request signal from the operating system, and perform the operation instructed by the received clock-related request signal (S720). For example, the abstraction layer having received the clock-related request signal may identify that the deletion of the stored error information of the PTP clock is requested, and accordingly delete the error information indicated by the received error information from the predetermined list.

The abstraction layer may generate a clock-related response signal. The clock-related response signal may include information on whether the operation instructed by the clock-related request signal has been completed. In case that the information indicating whether the instructed operation is completed is configured as '0', this may indicate that the operation of deleting the error information of the PTP clock indicated by the clock-related request signal has been successfully completed. In case that the information indicating whether the instructed operation is completed is configured as '1', this may indicate that the operation of deleting the error information of the PTP clock instructed by the clock-related request signal has not been successfully completed. The abstraction layer may transmit the generated clock-related response signal to the operating system (S730).

The operating system may receive the clock-related response signal which is a response to the clock-related request signal from the abstraction layer. In case that the information indicating whether the instructed operation is completed which is included in the clock-related response signal is configured as '0', the operating system may identify that the operation of deleting the error information of the PTP clock has been completed. On the contrary, in case that the information is configured as '1', the operating system may identify that the operation of deleting the error information of the PTP clock has not been completed.

Hereinafter, a procedure for transmitting an AVB stream, performed in a communication node including the abstraction layer 500, will be explained.

Figure 8:
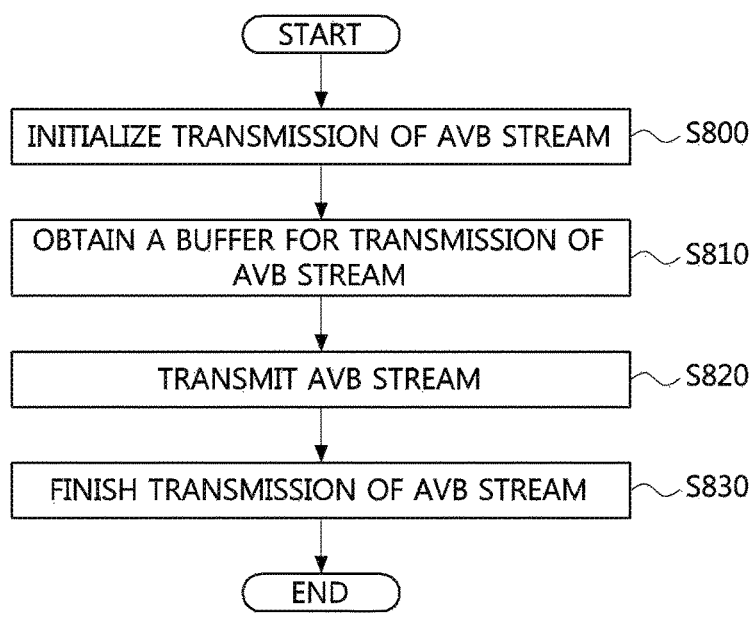
FIG. 8 is a sequence chart illustrating an operation method of a communication node according to a third example form of the present disclosure.

FIG. 8 is a sequence chart illustrating an operation method of a communication node according to a third example form of the present disclosure.

Referring to FIG. 8, a communication node wanting to transmit an AVB stream may perform an initialization procedure for transmission of the AVB stream (S800). In the initialization procedure of the AVB stream, a talker unit of the communication node may generate a first request signal requesting to initialize the transmission of the AVB stream. The talker unit may correspond to the talker unit 355 explained referring to FIG. 3, or the taker unit 451-4 explained referring to FIG. 4. The first request signal may include an identifier of the AVB stream, information on the number of blocks in a circular queue and the size of the blocks, maximum frame size information, maximum interframe interval information, information on an initial value of a virtual LAN (VLAN) header, information on an initial value of an Ethernet header, and information on an initial value of IEEE 1722 header. The talker unit may transmit the first request signal to the abstraction layer (e.g. the AVB stream transmission module 506 explained referring to FIG. 5). The abstraction layer may receive the first request signal, and transmit the first request signal to the hardware layer (e.g. the hardware layer 310 explained referring to FIG. 3, or the hardware layer 410 explained referring to FIG. 4). The hardware layer may receive the first request signal, and identify that the initialization for the transmission of the AVB stream is requested based on the received first request signal.

The hardware layer perform configuration of a descriptor used for identifying the AVB stream, configuration of a buffer, configuration of a shaping parameter, initialization of a VLAN header, initialization of an Ethernet header, initialization of IEEE 1722 header, or the like. The hardware layer may generate a first response signal. When the initialization procedure for the AVB stream is completed, the first response signal may include the descriptor of the AVB stream. When the initialization procedure for the AVB stream is not completed, the first response signal may include at least one of information indicating that a common error exists, information indicating that resources needed for processing the first request signal are not sufficient, and a duplicated identifier. The hardware layer may transmit the first response signal to the abstraction layer. The abstraction layer may receive the first response signal, and transmit the received first response signal to the talker unit.

The talker unit may receive the first response signal which is a response to the first request signal. In case that the descriptor of the AVB stream is included in the first response signal, the talker unit may identify that the initialization procedure for the AVB stream has been completed. In other cases, the talker unit may identify that the initialization procedure for the AVB stream has not been completed.

After completion of the initialization procedure for the AVB stream, the communication node may perform a procedure for obtaining a buffer for transmitting the AVB stream (S810). In the procedure for obtaining the buffer, the talker unit may generate a second request signal requesting to obtain the buffer. The second request signal may include the descriptor of the AVB stream. The talker unit may transmit the second request signal to the abstraction layer (e.g. the AVB stream transmission module 506). The abstraction layer may receive the second request signal, and transmit the received second request signal to the hardware layer. The hardware layer may receive the second request signal, identify that the obtaining of the buffer is requested based on the received second request signal, and perform an operation for obtaining the buffer for transmitting the AVB stream.

The hardware layer may generate a second response signal. When the buffer is obtained, the second response signal may include a start index of the obtained buffer blocks. On the contrary, when the buffer is not obtained, the second response signal may include at least one of information indicating that a common error exists, and information indicating that resources needed for processing the second request signal are not sufficient. The hardware layer may transmit the second response signal to the abstraction layer. The abstraction layer may receive the second response signal, and transmit the received second response signal to the talker unit. The talker unit may receive the second response signal, and identify information included in the second response signal. For example, from the second response signal, the talker unit may obtain the start index of the obtained buffer blocks used for transmitting the AVB stream.

After completion of the procedure for obtaining the buffer, the communication node may perform a procedure for requesting transmission of the AVB stream (S820). In the procedure for requesting transmission of the AVB stream, the talker unit may generate a third request signal requesting to transmit the AVB stream. The third request signal may include the descriptor of the AVB stream, the start index of the buffer blocks used for the transmission of the AVB stream, and information on the number of buffer blocks. The talker unit may transmit the third request signal to the abstraction layer (e.g. the AVB stream transmission module 506). The abstraction layer may receive the third request signal, and transmit the received third request signal to the hardware layer.

The hardware layer may receive the third request signal, and identify that the transmission of the AVB stream is requested based on the received third request signal. Accordingly, the hardware layer may transmit the AVB stream located in the buffer blocks indicated by the third request signal. The hardware layer may generate a third response signal. The third response signal may include information on the number of buffer blocks in which the successfully transmitted AVB stream is located. On the contrary, in case that the AVB stream has not been successfully transmitted, the third response signal may include at least one of information indicating that a common error exists, and information indicating 'out of range'. The hardware layer may transmit the third response signal to the abstraction layer. The abstraction layer may receive the third response signal, and transmit the received third response signal to the talker unit. The talker unit may receive the third response signal, and identify information included in the third response signal. For example, from the third response signal, the talker unit may obtain the start index of the buffer blocks in which the successfully-transmitted AVB stream is located.

After completion of the procedure for requesting the transmission of the AVB stream, the communication node may perform a procedure for requesting to finalize the transmission of the AVB stream (S820). In the procedure for requesting to finalize the transmission of the AVB stream, the talker unit may generate a fourth request signal requesting to finalize the transmission of the AVB stream. The fourth request signal may include the descriptor of the AVB stream. The talker unit may transmit the fourth request signal to the abstraction layer. The abstraction layer may receive the fourth request signal, and transmit the received fourth request signal to the hardware layer.

The hardware layer may receive the fourth request signal, and identify that the finalization of the transmission of the AVB stream is requested based on the received fourth request signal. The hardware layer may perform release of the buffer, and release of the shaping parameter. Then, the hardware layer may generate a fourth response signal. The fourth response signal may include whether the operation instructed by the fourth request signal has been successfully completed. On the contrary, in case that the operation instructed by the fourth request signal has not been successfully completed, the fourth response signal may include at least one of information indicating that a common error exists, and information indicating that the identifier is not matched. Then, the hardware layer may transmit the generated fourth response signal to the abstraction layer. The abstraction layer may receive the fourth response signal, and transmit the received fourth response signal to the talker unit. The talker unit may receive the fourth response signal, and identify information included in the fourth response signal. For example, in case that the fourth response signal includes information indicating whether the operation instructed by the fourth request signal is completed, the talker unit may determine that the transmission of the AVB stream has been completed. In other cases, the talker unit may determine that the transmission of the AVB stream has not been completed.

Meanwhile, the communication node may perform a procedure for configuring indexes of buffer blocks. For example, the talker unit may generate a fifth request signal requesting to configure buffer blocks used for transmitting the AVB stream. The fifth request signal may include the descriptor of the AVB stream, an index of buffer blocks, or the like. Then, the talker unit may transmit the fifth request signal to the abstraction layer. The abstraction layer may receive the fifth request signal, and transmit the received fifth request signal to the hardware layer.

The hardware layer may receive the fifth request signal, and identify that the configuration of the buffer blocks is requested based on the received fifth request signal. The hardware layer may configure the buffer blocks indicated by the index of the buffer blocks, which is included in the fifth request signal, to be the buffer blocks used for transmitting the AVB stream. The hardware layer may generate a fifth response signal. In case that the configuration of the buffer blocks has been successfully completed, the fifth response signal may include the index of the configured buffer blocks. On the contrary, in case that the configuration of the buffer blocks has not been successfully completed, the fifth response signal may include at least one of information indicating that a common error exists and information indicating out of range. The hardware layer may transmit the fifth response signal to the abstraction layer. The abstraction layer may receive the fifth response signal, and transmit the received fifth response signal to the talker unit. The talker unit may receive the fifth response signal, and identify information included in the fifth response signal. For example, in case that the index of the configured buffer blocks is included in the fifth response signal, the talker unit may determine that the configuration of the buffer blocks has been successfully completed. In other cases, the talker unit may determine that the configuration of the buffer blocks has not been successfully completed.

Hereinafter, a procedure for receiving an AVB stream, performed in a communication node including the abstraction layer 500, will be explained.

Figure 9:
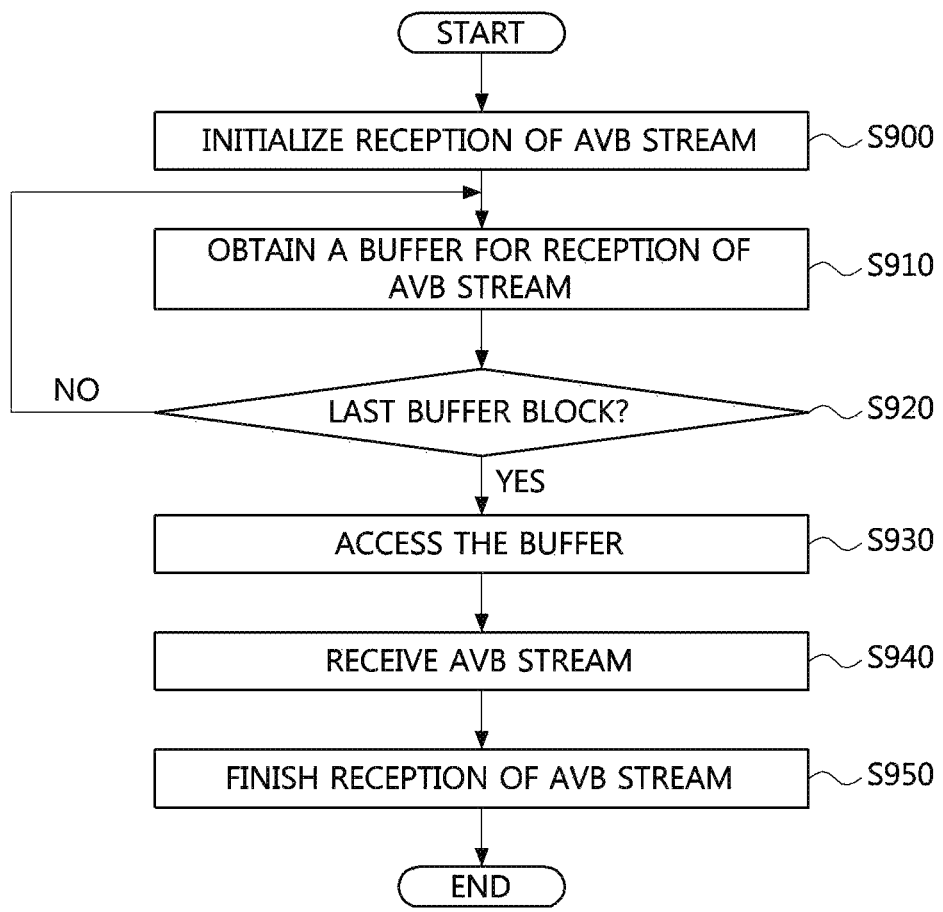
FIG. 9 is a sequence chart illustrating an operation method of a communication node according to a fourth example form of the present disclosure.

FIG. 9 is a sequence chart illustrating an operation method of a communication node according to a fourth example form of the present disclosure.

Referring to FIG. 9, a communication node wanting to receive an AVB stream may perform an initialization procedure for reception of the AVB stream (S900). In the initialization procedure of the AVB stream, a listener unit of the communication node may generate a first request signal requesting to initialize the reception of the AVB stream. The listener unit may correspond to the listener unit 356 explained referring to FIG. 3, or the listener unit 451-5 explained referring to FIG. 4. The first request signal may include a descriptor of the AVB stream, information on the number of blocks in a circular queue and the size of the blocks, a multicast address, an identifier of the AVB stream, or the like. The listener unit may transmit the first request signal to the abstraction layer (e.g. the AVB stream reception module 507 explained referring to FIG. 5). The abstraction layer may receive the first request signal, and transmit the first request signal to the hardware layer (e.g. the hardware layer 310 explained referring to FIG. 3, or the hardware layer 410 explained referring to FIG. 4). The hardware layer may receive the first request signal, and identify that initialization for the reception of the AVB stream is requested based on the received first request signal.

The hardware layer may perform configuration of buffers for receiving the AVB stream, mapping between the identifier and descriptor of the AVB stream. The hardware layer may generate a first response signal which is a response to the first request signal. When the reception initialization procedure for the AVB stream is completed, the first response signal may include the descriptor of the AVB stream. When the initialization procedure for the reception of the AVB stream is not completed, the first response signal may include at least one of information indicating that a common error exists, information indicating that resources needed for processing the first request signal are not sufficient, and a duplicated identifier. The hardware layer may transmit the first response signal to the abstraction layer. The abstraction layer may receive the first response signal, and transmit the received first response signal to the listener unit.

The listener unit may receive the first response signal. In case that the descriptor of the AVB stream is included in the first response signal, the listener unit may identify that the initialization procedure for the reception of the AVB stream has been completed. In other cases, the listener unit may identify that the initialization procedure for the reception of the AVB stream has not been completed.

After completion of the initialization procedure for the AVB stream, the communication node may perform a procedure for obtaining a buffer for receiving the AVB stream (S910). In the procedure for obtaining the buffer, the listener unit may generate a second request signal requesting to obtain the buffer. The second request signal may include the descriptor of the AVB stream. The listener unit may transmit the second request signal to the abstraction layer. The abstraction layer may transmit the received second request signal to the hardware layer.

The hardware layer may receive the second request signal, identify that the obtaining of the buffer is requested based on the received second request signal, and perform an operation for obtaining the buffer for receiving the AVB stream. The hardware layer may generate a second response signal which is a response to the second request signal. When the buffer is obtained, the second response signal may include a start index of the obtained buffer blocks, and information on the size of the AVB stream located in the buffer blocks. On the contrary, when the buffer is not obtained, the second response signal may include at least one of information indicating that a common error exists, and information indicating resources needed for processing the second request signal are not sufficient. The hardware layer may transmit the second response signal to the abstraction layer. The abstraction layer may receive the second response signal, and transmit the received second response signal to the listener unit.

The listener unit may receive the second response signal, and identify information included in the second response signal. For example, from the second response signal, the listener unit may obtain the start index of the obtained buffer blocks used for receiving the AVB stream, and information on the size of the AVB stream located in the buffer blocks.

After completion of the procedure for obtaining the buffer, the communication node may determine whether the obtained buffer blocks correspond to the last buffer blocks in which the AVB stream is located (S920). In case that the obtained buffer blocks are not the last buffer blocks in which the AVB stream is located, the communication node may perform the step S910 again. In case that the obtained buffer blocks are the last buffer blocks in which the AVB stream is located, the communication node may perform a step S930.

The communication node may perform an access procedure on the buffer (S930). In the access procedure, the listener unit may generate a third request signal for requesting to access the buffer blocks. The third request signal may include the descriptor of the AVB stream and the index for buffer blocks in which the AVB stream to be received is located. The listener unit may transmit the third request signal to the abstraction layer. The abstraction layer may receive the third request signal, and transmit the received third request signal to the hardware layer.

The hardware layer may receive the third request signal, and identify that the accessing the buffer blocks is requested based on the received third request signal. Accordingly, the hardware layer may access the location of the buffer blocks indicated by the third request signal. The hardware layer may generate a third response signal which is a response to the third request signal. After completion of accessing the buffer blocks, the third response signal may include the index of the buffer blocks in which the AVB stream to be received is located. On the contrary, in case that the accessing the location of the buffer blocks has not been successfully completed, the third response signal may include at least one of at least one of information indicating that a common error exists and information indicating out of range. The hardware layer may transmit the third response signal to the abstraction layer. The abstraction layer may receive the third response signal, and transmit the received third response signal to the listener unit.

The listener unit may receive the third response signal. In case that the third response signal includes the index of buffer blocks in which the AVB stream to be received is located, the listener unit may determine that the accessing of the buffer blocks are completed. In other cases, the listener unit may determine that the accessing of the buffer blocks are not completed.

After the procedure for accessing the buffer is completed, the communication node may perform a procedure for receiving the AVB stream (S940). In the procedure for receiving the AVB stream, the listener unit may generate a fourth request signal requesting to receive the AVB stream. The fourth request signal may include the descriptor of the AVB stream, information on the start index of the buffer blocks in which the AVB stream to be received is located, and information on the number of the buffer blocks. The listener unit may transmit the fourth request signal to the abstraction layer. The abstraction layer may receive the fourth request signal, and transmit the received fourth request signal to the hardware layer.

The hardware layer may receive the fourth request signal, and identify that the reception of the AVB stream is requested based on the received fourth request signal. The hardware layer may receive the AVB stream from the buffer blocks indicated by the fourth request signal. Then, the hardware layer may generate a fourth response signal. In case that the AVB stream has been successfully received, the fourth response signal may include information on the number of buffer blocks in which the received AVB stream is located. In case that the AVB stream has not been successfully received, the fourth response signal may include at least one of at least one of information indicating that a common error exists and information indicating out of range. The hardware layer may transmit the fourth response signal to the abstraction layer. The abstraction layer may receive the fourth response signal, and transmit the received fourth response signal to the listener unit.

The listener unit may receive the fourth response signal. In case that the fourth response signal includes the information on the number of buffer blocks in which the received AVB stream is located, the listener unit may determine that the procedure for receiving the AVB stream has been successfully completed. In other cases, the listener unit may determine that the procedure for receiving the AVB stream has not been successfully completed.

After completion of the procedure for receiving the AVB stream, the communication node may perform a procedure for finalizing the reception of the AVB stream (S950). In the procedure for finalizing the reception of the AVB stream, the listener unit may generate a fifth request signal requesting to finalize the reception of the AVB stream. The fifth request signal may include the descriptor of the AVB stream. The listener unit may transmit the fifth request signal to the abstraction layer. The abstraction layer may receive the fifth request signal, and transmit the received fifth request signal to the hardware layer.

The hardware layer may receive the fifth request signal, and identify that the finalization of the reception of the AVB stream is requested based on the received fifth request signal. The hardware layer may perform release of the buffer, and release of the mapping between the identifier and the descriptor of the AVB stream. The hardware layer may generate a fifth response signal which is a response to the fifth request signal. The fifth response signal may include information indicating the finalization of the reception of the AVB stream. On the contrary, in case that the reception of the AVB stream has not been finalized, the fifth response signal may include at least one of information indicating that a common error exists, and information indicating that the identifier is not matched. Then, the hardware layer may transmit the generated fifth response signal to the abstraction layer. The abstraction layer may receive the fifth response signal, and transmit the received fifth response signal to the listener unit.

The listener unit may receive the fifth response signal. In case that the fifth response signal includes information indicating the finalization of the reception of the AVB stream, the listener unit may determine that the reception of the AVB stream has been successfully completed. In other cases, the listener unit may determine that the reception of the AVB stream has not been successfully completed.

Hereinafter, a procedure for obtaining a MAC address, performed in a communication node including the abstraction layer 500, will be explained.

Figure 10:
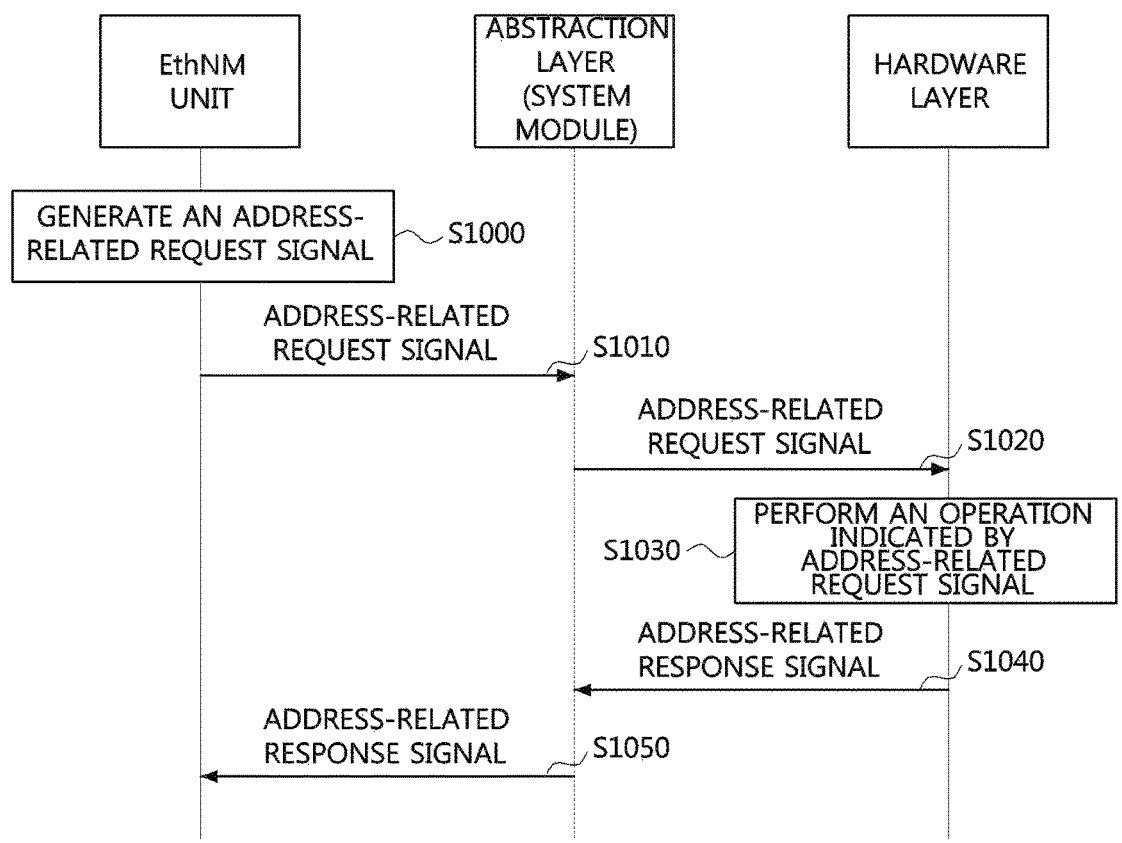
FIG. 10 is a sequence chart illustrating an operation method of a communication node according to a fifth example form of the present disclosure.

FIG. 10 is a sequence chart illustrating an operation method of a communication node according to a fifth example form of the present disclosure.

Referring to FIG. 10, an EthNM unit may correspond to the EthNM unit 354 explained referring to FIG. 3, or the EthNM unit 451-3 explained referring to FIG. 4. An abstraction layer may correspond to the abstraction layer 500 (e.g. the system module 508) explained referring to FIG. 5. A hardware layer may correspond to the hardware layer 310 (e.g. the MAC layer unit 312) explained referring to FIG. 3, or the hardware layer 410 (e.g. the MAC layer unit 411-2) explained referring to FIG. 4.

The EthNM unit may generate an address-related request signal requesting a MAC address (S1000), and transmit the generated address-related request signal to the abstraction layer (S1010). The abstraction layer may receive the address-related request signal, and transmit the received address-related request signal to the hardware layer (S1020). The hardware layer may receive the address-related request signal, and perform an operation indicated by the received address-related request signal (S1030). Since the hardware layer identifies that the MAC address is requested, the hardware layer may generate an address-related response signal including an MAC address. The hardware layer may transmit the address-related response signal to the abstraction layer (S1040). The abstraction layer may receive the address-related response signal, and transmit the received address-related response signal to the EthNM unit (S1050). The EthNM unit may receive the address-related response signal which is a response to the address-related request signal, and obtain the MAC address included in the address-related response signal. On the contrary, in case that the address-related response signal includes information indicating that a common error exists, the EthNM unit may determine that the obtaining of the MAC address has failed.

The methods according to forms of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the forms of the present disclosure and their advantages have been described in detail above, it should be understood that various changes, substitutions and alterations may be made herein without departing from the scope of the disclosure.

What is claimed is:

1. A transmission method performed by a communication node in an Ethernet-based vehicle network, the communication node including a hardware layer, an abstraction layer, a middleware layer, and an application layer, and the method comprising:

receiving, by the hardware layer, a first request signal requesting to perform an initialization operation for transmission of a stream from the abstraction layer;

performing, by the hardware layer, the initialization operation for the transmission of the stream based on the first request signal;

when the initialization operation is completed, transmitting, by the hardware layer, a first response signal including a descriptor of the stream which is configured by the initialization operation to the abstraction layer;

receiving, by the hardware layer, a second request signal which includes the descriptor of the stream and requests to perform an obtaining operation of a buffer from the abstraction layer;

performing, by the hardware layer, the obtaining operation of the buffer for the transmission of the stream based on the second request signal;

when the obtaining operation is completed, transmitting, by the hardware layer, a second response signal including a start index of the buffer which is obtained by the obtaining operation to the abstraction layer;

storing, by the hardware layer, the stream in the buffer;

receiving, by the hardware layer, a third request signal requesting to transmit the stream from the abstraction layer;

transmitting, by the hardware layer, the stream stored in the buffer based on the third request signal;

receiving, by the hardware layer, a fourth request signal requesting to finalize the transmission of the stream; and performing, by the hardware layer, an operation of finalizing the transmission of the stream based on the fourth request signal.

2. The method according to claim 1, wherein the hardware layer includes a physical (PHY) layer unit and a medium access control (MAC) layer unit.

3. The method according to claim 1, wherein the abstraction layer includes a hardware abstraction layer (HAL) and an operating system abstraction layer (OSAL).

4. The method according to claim 1, wherein the middleware layer supports a transfer control protocol/internet protocol (TCP/IP) and an audio video bridging (AVB) protocol.

5. The method according to claim 1, wherein the first request signal includes information on an identifier (ID) of the stream, information on a circular queue, and information related to a transmission frame.

6. The method according to claim 1, wherein the initialization operation includes an operation of configuring the descriptor used for identifying the stream, an operation of configuring the buffer for each stream, an operation of configuring a shaping parameter, and an initialization operation of a frame header.

7. The method according to claim 1, wherein the start index indicates buffer blocks for the transmission of the stream.

8. The method according to claim 1, wherein the third request signal includes the descriptor of the stream, the start index of buffer blocks used for the transmission of the stream, and a number of buffer blocks comprising the buffer.

9. The method according to claim 1, wherein finalizing the transmission of the stream comprises releasing the buffer and a shaping parameter for the transmission of the stream.

10. A reception method performed by a communication node in an Ethernet-based vehicle network, the communication node including a hardware layer, an abstraction layer, a middleware layer, and an application layer, and the method comprising:

receiving, by the hardware layer, a first request signal requesting to perform a initialization operation for reception of a stream from the abstraction layer;

performing, by the hardware layer, the initialization operation for the reception of the stream based on the first request signal;

when the initialization operation is completed, transmitting, by the hardware layer, a first response signal including a descriptor of the stream which is configured by the initialization operation to the abstraction layer;

receiving, by the hardware layer, a second request signal which includes the descriptor of the stream and requests to perform an obtaining operation of a buffer from the abstraction layer;

performing, by the hardware layer, the obtaining operation of the buffer for the reception of the stream based on the second request signal;

when the obtaining operation is completed, transmitting, by the hardware layer, a second response signal including a start index of the buffer which is obtained by the obtaining operation to the abstraction layer;

receiving, by the hardware layer, a third request signal requesting to access the buffer from the abstraction layer;

accessing, by the hardware layer, the stream stored in the buffer based on the third request signal;

receiving, by the hardware layer, a fourth request signal requesting to receive the stream from the abstraction layer;

receiving, by the hardware layer, the stream from the buffer based on the fourth request signal;

receiving, by the hardware layer, a fifth request signal requesting to finalize the reception of the stream; and performing, by the hardware layer, an operation of finalizing the reception of the stream based on the fifth request signal.

11. The method according to claim 10, wherein the hardware layer includes a physical (PHY) layer unit and a medium access control (MAC) layer unit.

12. The method according to claim 10, wherein the abstraction layer includes a hardware abstraction layer (HAL) and an operating system abstraction layer (OSAL).

13. The method according to claim 10, wherein the middleware layer supports a transfer control protocol/internet protocol (TCP/IP) and an audio video bridging (AVB) protocol.

14. The method according to claim 10, wherein the first request signal includes information on an identifier (ID) of the stream, information on a circular queue, and information on a multicast address.

15. The method according to claim 10, wherein the initialization operation includes an operation of configuring the buffer for each stream, and an operation of mapping an identifier of the stream to the descriptor of the stream.

16. The method according to claim 10, wherein the second request signal includes further, a start index of buffer blocks used for the reception of the stream, and information on a size of the stream.

17. The method according to claim 10, wherein the third request signal includes the descriptor of the stream and an index of buffer blocks in which the stream to be received is located.

18. The method according to claim 10, wherein the fourth request signal includes the descriptor of the stream, and information on a number of buffer blocks in which the stream to be received is located.

19. The method according to claim 10, wherein finalizing the reception of the stream comprises releasing the buffer for the reception of the stream, and releasing the mapping between an identifier of the stream and the descriptor of the stream.

* * * * *